L. R. GRUSS.
VEHICLE WHEEL.
APPLICATION FILED MAR. 16, 1911.
1,061,537.
Patented May 13, 1913.
2 SHEETS—SHEET 1.
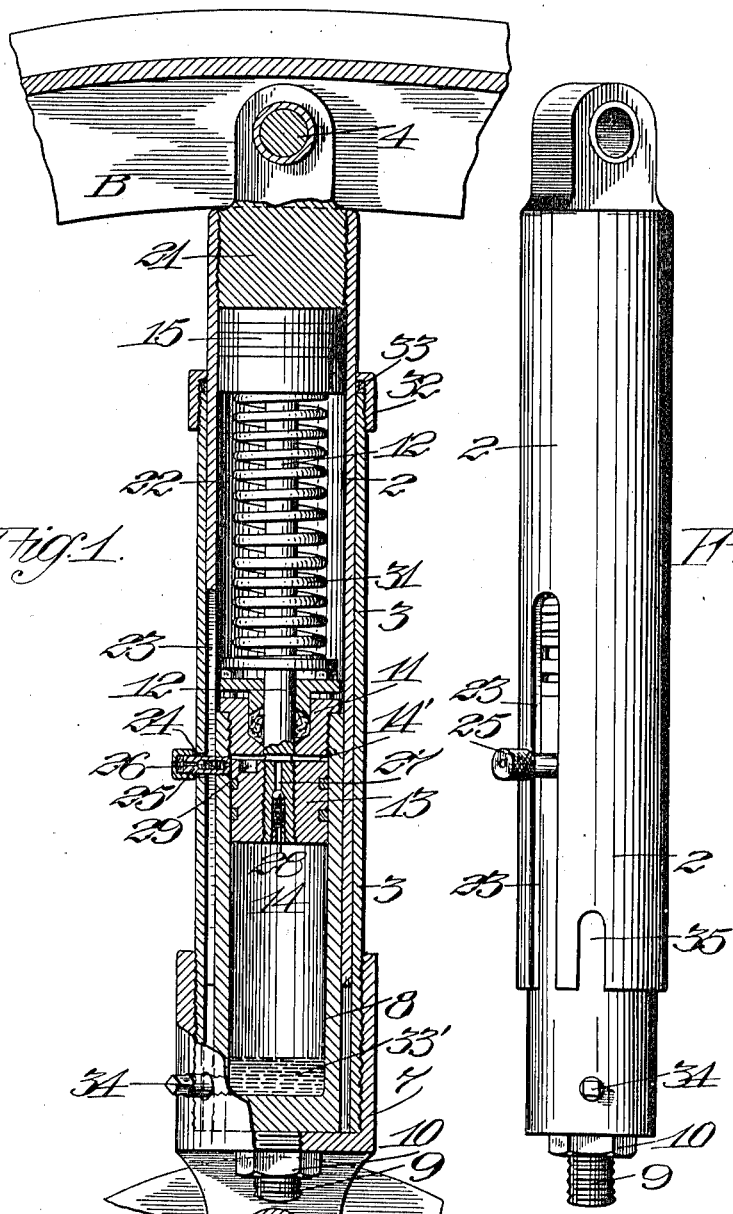

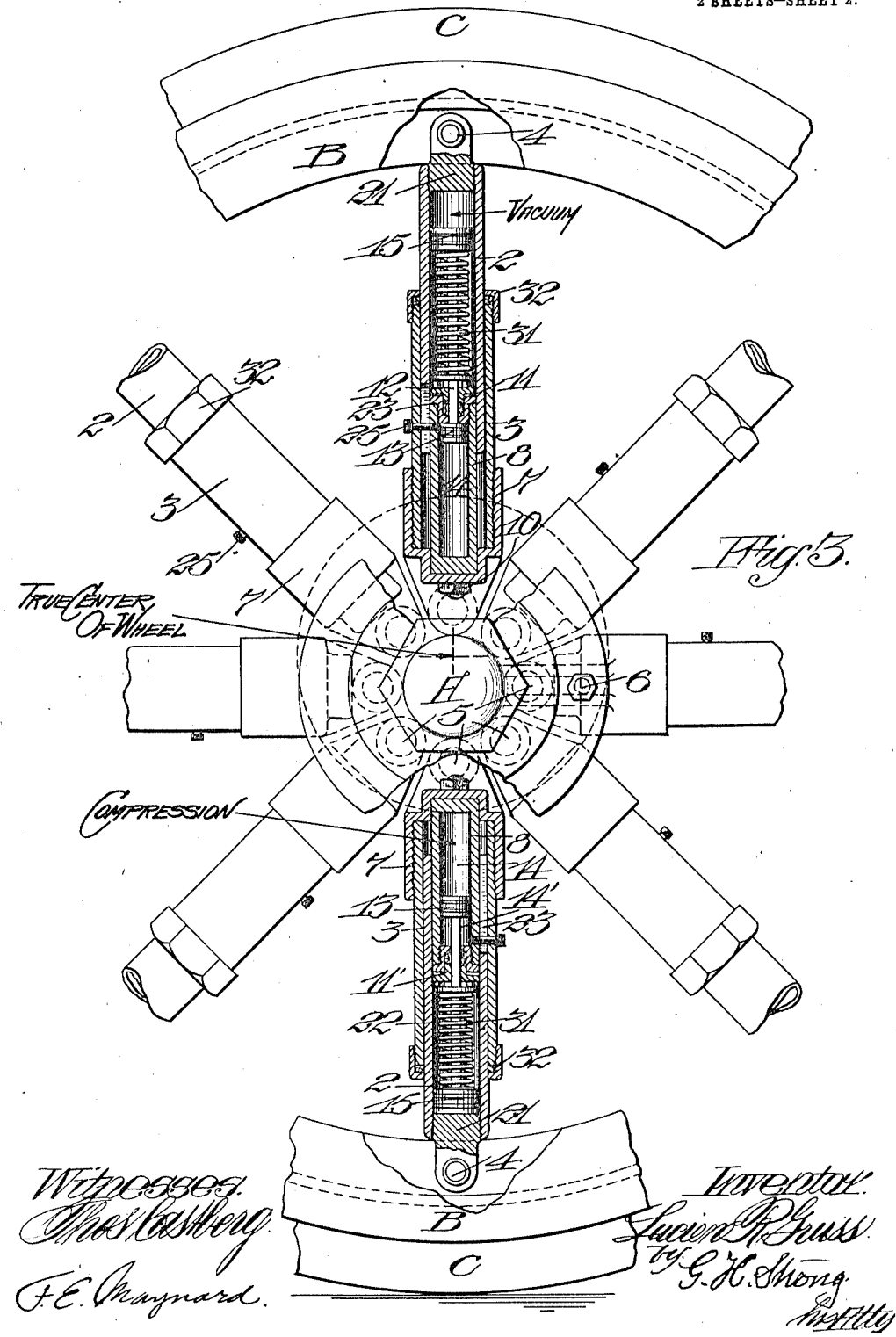

UNITED STATES PATENT OFFICE.

LUCIEN R. GRUSS, OF SAN FRANCISCO, CALIFORNIA, ASSIGNOR TO AUTO COMPRESSED-AIR WHEEL COMPANY, OF CHICO, CALIFORNIA, A CORPORATION OF CALIFORNIA.

VEHICLE-WHEEL.

1,061,537.      Specification of Letters Patent.      Patented May 13, 1913.

Application filed March 16, 1911. Serial No. 614,822.

*To all whom it may concern:*

Be it known that I, LUCIEN R. GRUSS, a citizen of the United States, residing in the city and county of San Francisco and State of California, have invented new and useful Improvements in Vehicle-Wheels, of which the following is a specification.

This invention relates to vehicle wheels, and particularly to cushion wheels employing a floating piston for automobiles and the like.

The object of this invention is to provide a simple, practical pneumatic wheel without the use of an inflatable or puncturable tire; but in which the spokes are so constructed and arranged that they act automatically to maintain an air cushion of suitable character to carry the load without transmitting the usual jars and vibrations, incident to travel, to the vehicle body and occupants of the car.

The invention consists of the parts and the combination and construction of parts as hereinafter more fully described and claimed, having reference to the accompanying drawings, in which—

Figure 1 is a longitudinal section of a spoke with the piston and parts in normal position with the hub and rim of the wheel concentric. Fig. 2 is a perspective view of a spoke detached. Fig. 3 is a side elevation of a part of a wheel, with the top and bottom opposed spokes in section, with the lowermost section operating on compression and the upper on vacuum.

A is a hub, and B represents the rim of my wheel, to which latter is applied the solid rubber tire or tread C.

The invention resides in the spoke construction. Each spoke is made in two telescoping sections 2 and 3, the outer section of each spoke being pivoted to the rim, as at 4, and the inner section of all the spokes, except one, being pivoted to the hub, as shown at 5. One spoke is secured to the hub by a lug or key 6, as shown in Fig. 4, for the purpose of giving traction. The inner section 3 of each spoke is secured to a suitable socket-piece 7. Secured concentrically within this socket-piece and rigidly connected thereto is a cylinder 8. As shown in Fig. 2, the cylinder 8 has a screw-threaded projection 9 on its lower end adapted to pass through the bottom of the socket-piece 7 and to be rigidly secured thereto by a nut 10. This forms a simple, practical means for connecting the cylinder rigidly to the socket. The outer telescoping section 2 works in the space formed between the cylinder 8 and the outer tube 3.

The outer end of the cylinder 8 is closed by a stuffing box 11, through which a piston rod 12 operates. The end of the piston rod 12 nearest the hub carries a piston 13, working in the chamber 14, formed in the cylinder 8. This chamber 14 is a pneumatic cushion chamber, or compression chamber, as I term it. The outer end of the piston rod connects to a piston head 15, which has a snug sliding fit in the outer spoke section 2. Normally, with the wheel hub and rim concentric, as shown in Fig. 1, the pistons 15—13 will be at the end of their stroke and seated against the ends of their respective chambers.

The outer piston 15 normally seats snug against the end 21 of its cylinder, and whenever it moves away from its seat 21 a vacuum is created which tends to draw this piston 15 back to its seat. The space 22 in the tube 2 on the side of the piston 15 nearest the hub is always in free communication with the outer atmosphere through a slot 23 formed in the tube 2, which slot opens out through a slot 24 formed in the outside section 3. The piston 15, in fact, acts on vacuum as a return check and auxiliary cushion to piston 15.

In order to admit air from time to time into the compression chamber 14 and automatically proportion the compression to the load carried, I tap a perforated plug 25, in which is a valve 26, into the cylinders 3—8; the slot 23 in the telescoping cylinder 2 accommodating the plug as the spoke shortens and lengthens. This valve 26 automatically closes outward and allows air to be drawn into the space 14' in chamber 14, Fig. 3, between piston 13 and gland or diaphragm closure 11, when piston 13 moves toward the hub. When the piston moves away from the hub, valve 26 closes, and such air as has been drawn in to the space 14' may pass through the valved ports 27 into the compression chamber 14. A valve 28 in port 27 prevents the air escaping from chamber 14 where it performs the functions of a pneumatic cushion in sustaining the load.

In order to prevent the cylinders going on pumping until they become too hard, I form little pockets 29 in the end of piston 13 adjacent to the stuffing box 11 in which some air is always trapped, and is under some compression; the pressure in the pockets 29 sometimes equaling, but never exceeding, the pressure in the compression chamber 14.

In practice, the operation of the wheel is as follows: As the wheel revolves, each spoke, as it comes vertically beneath the hub, will assume more or less the position shown in Fig. 3, and the opposite spoke above the hub will assume substantially the position shown at the top of Fig. 3; the wheel hub dropping more or less and becoming accordingly more or less eccentric to the rim. The amount of eccentricity of the hub with respect to the rim, of course, determines the length of the stroke of the pumping piston 13 and of the vacuum piston 15. It is to be borne in mind that normally with the hub concentric the two pistons 13—15 in every spoke rest against their respective seats 11—21. Therefore, it will be seen by reference to Fig. 3 that the piston 15 in the spoke below the hub will rest against its seat 21 and so rigidly support the piston rod 12, while the piston 13 may move up into its compression chamber 14 in cylinder 8 a distance equal to the depression of the hub A below its normal center. This upward movement of piston 13 effects a compression of the air in chamber 14, since there is no outlet from chamber 14. If, when the wheel was first started, the air in all the chambers 14 was at, or only slightly above, atmosphere, of course the pistons 13 would move inwardly quite a distance, this movement, however, lessening with each revolution of the wheel until, as practice shows, after a few revolutions the chambers 14 become pumped up to maintain their compression proportionately to the load carried. The air which is drawn in through valve 26 is trapped in the space 14' and pockets 29 so that when the piston 13 moves back again toward its seat against the stuffing box 11, the air in the pockets 29 and space 14' is subject to compression, and even when an equalization of pressure on the two sides of the piston permits air to pass into the chamber 14, there is some air always under compression in the pocket or pockets 29; consequently, the next time the piston 13 moves in to compress air in chamber 14, the air in pocket 29 expands, and until this expansion reduces the atmospheric pressure in pocket 29 and space 14 to, or below, atmosphere, no more air is drawn in past valve 26.

Whenever the piston 13 is acting as a pump, or acting to compress the air in its chamber 14, the outer vacuum piston 15 is supported solidly against its seat 21, (see lower spoke, Fig. 3) and whenever the vacuum piston 15 is operating on vacuum, due to the elongation of the spoke, piston 13 is seated snug against stuffing box 11 (see top spoke, Fig. 3). This vacuum thus formed has the double function of forming a cushion suspension for a part of the load and of providing means coöperating with the spring 31 to effect a quick return of the two pistons to the outer end of their respective cylinders. In order to exclude any dust from entering the interior of the spokes, or coming between the telescoping sections, an annular cap 32 screws down over the end of the section 3, and is adapted to compress a packing 33 against the inner tube 2. A considerable volume of oil represented at 33' is maintained in the cylinder 14, being admitted through a suitable opening which is normally closed by the screw plug 34; the lower end of the cylinder 2 being slotted, as at 35, Fig. 2, to accommodate the plug 34 in the telescoping movement of the spoke sections. The spring 31 is adapted to bear against the stuffing box 11 and piston 15 and normally move the piston outwardly. This spring has nothing to do with effecting any cushioning action or sustaining any weight, but is merely ancillary to the vacuum chamber provided by the piston 15, and insures a quick outward movement of the two pistons to their outermost limits. The piston rod 12, with its piston head, is entirely disconnected from the hub and rim and from the spoke sections in which it moves, except for the free floating piston action maintained and arranged for within the spoke sections.

The chief point of novelty in the present combination is in the construction of the floating piston with one end working on vacuum and the other on compression, the method of automatic pumping, and the specific spoke construction.

Having thus described my invention, what I claim and desire to secure by Letters-Patent, is—

1. The combination in a vehicle wheel having a hub and rim, of a socket piece connected with the hub, said socket piece carrying a tubular extension, a cylinder pivoted to the rim and telescoping with said tubular extension, a cylinder fixed to the socket piece and telescoping with said rim cylinder, a double-ended floating piston having one end working in a compression chamber in the cylinder on the socket piece, and having its other end working in a vacuum chamber in the rim cylinder, said cylinders and piston constructed and arranged so that the compression-chamber piston-head automatically operates to pump up the compression chamber proportionately to the load carried, and said vacuum-chamber piston-head normally seats by vacuum in its chamber.

2. The combination in a vehicle wheel having a hub and rim, of a socket piece connected with the hub, said socket piece carrying a tubular extension, a cylinder pivoted to the rim and telescoping with said tubular extension, a cylinder fixed to the socket piece and telescoping with said rim cylinder, and a double-ended floating piston, having one end working in a compression chamber in the cylinder on the socket piece, and having its other end working in a vacuum chamber in the rim cylinder, said cylinder and piston constructed and arranged so that the compression-chamber piston-head automatically operates to pump up the compression chamber proportionately to the load carried, and said vacuum-chamber piston-head normally seats by vacuum in its chamber, valved ports in the piston through which communication is had with said compression chamber, and said chamber also containing constantly a body of oil.

3. A cushioning device comprising reciprocating telescopic, tubular members inclosing a double-ended piston, one head of which fits in a chamber in one section and acts always on compression in said chamber, the other head of which fits in a chamber in the other spoke section and always works on vacuum, the parts so constructed and arranged that the piston heads both normally abut against the outer end of their respective chambers.

4. A cushioning device comprising a pair of telescoping cylinders, a free moving piston-head in each cylinder, a piston rod common to both heads and connecting them so that they move in unison, a stuffing box through which said piston rod extends and which closes the end of the inner cylinder, the space in said inner cylinder on one side of the piston head forming a compression chamber, and means by which, on the reciprocation of the piston rod said compression chamber may be automatically filled with air.

5. A cushioning device comprising a pair of telescoping cylinders, a free moving piston head in each cylinder, a piston rod common to both heads and connecting them so that they move in unison, a stuffing box through which said piston rod extends and which closes the end of the inner cylinder, the space in said inner cylinder on one side of the piston head forming a compression chamber, means by which, on the reciprocation of the piston rod, said compression chamber may be automatically pumped up, and vacuum producing means operating on the other head in the outer cylinder for normally maintaining the piston head in the inner cylinder against said stuffing box.

6. A cushioning device consisting of a socket-piece having a cylindrical extension, a cylinder with its inner end closed within the socket-piece and concentric with and spaced from the said cylindrical extension, said inner cylinder having means at its closed end for securing it concentrically within said socket-piece, the opposite end of said inner cylinder having a stuffing box, a piston rod extending through said stuffing box and carrying a valved piston on its inner end operating in said cylinder, means for admitting air into the space formed between the stuffing box and piston when the piston is moved inwardly, and thence delivering it to the opposite side of the piston and within the cylinder when the piston moves in the opposite direction, an outer cylinder telescoping with said first named cylindrical extension and operating in the space between said extension and said inner cylinder, said outer cylinder having means providing a loose seat for the outer end of said piston rod, said piston rod entirely disconnected from each of said cylinders, and means for maintaining said piston normally at the outer end of its stroke.

7. A cushioning device consisting of a socket-piece having a cylindrical extension, a cylinder with its inner end closed within the socket-piece and concentric with and spaced from said cylindrical extension, said inner cylinder having means at its closed end for securing it concentrically within said socket piece, the opposite end of said inner cylinder having a stuffing box, a piston rod extending through said stuffing box and carrying a valved piston on said inner end operating in said cylinder, means for admitting air into the space formed between the stuffing box and piston when the piston is moved inwardly, and thence delivering it to the opposite side of the piston and within the cylinder when the piston moves in the opposite direction, an outer cylinder telescoping with said first named cylindrical extension and operating in the space between said extension and said inner cylinder, said outer cylinder inclosing a vacuum chamber, said piston rod having a piston head working loose in said vacuum chamber.

8. A cushioning device consisting of a socket piece having a cylindrical extension, a cylinder with its inner end closed within the socket piece and concentric with and spaced from said cylindrical extension, said inner cylinder having a screw threaded boss on its closed end projecting through a perforation in the bottom of the socket-piece, and a nut screwed on to said screw-threaded boss for the purpose of maintaining said inner cylinder in fixed position, the opposite end of said inner cylinder having a stuffing box, a piston rod extending through said stuffing box and carrying a valved piston on its inner end operating in said cylinder, means for admitting air into the space formed between the stuffing box and piston when the piston is moved inwardly, and thence delivering it to the opposite side of the piston and within the cylinder when the piston moves in the opposite direction, an outer cylinder telescoping with said first named cylindrical extension and operating in the space between said extension and said inner cylinder, said outer cylinder having means providing a loose seat for the outer end of said piston rod, said piston rod entirely disconnected from each of said cylinders, and means for maintaining said piston normally at the outer end of its stroke.

9. In a pneumatic spoke, a cushioning device including a socket piece with a cylindrical extension, a cylinder with its inner end closed within the socket-piece and concentric with and spaced from said cylindrical extension, said inner cylinder having a screw-threaded boss on its closed end projecting through a perforation in the bottom of the socket-piece, and a nut screwed on to said screw-threaded boss for the purpose of maintaining said inner cylinder in fixed position.

In testimony whereof I have hereunto set my hand in the presence of two subscribing witnesses.

LUCIEN R. GRUSS.

Witnesses:
  CHARLES EDELMAN,
  C. C. COOK.